US010637265B2

(12) United States Patent
Jabori et al.

(10) Patent No.: US 10,637,265 B2
(45) Date of Patent: Apr. 28, 2020

(54) ELECTRONIC DEVICE WITH CHARGING MODULE

(71) Applicant: HEWLETT-PACKARD DEVELOPMENT COMPANY, L.P., Houston, TX (US)

(72) Inventors: Monji G Jabori, Houston, TX (US); Bach Lien Nguyen, Houston, TX (US); David Isaac Blatt, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 286 days.

(21) Appl. No.: 15/539,779

(22) PCT Filed: Jan. 6, 2015

(86) PCT No.: PCT/US2015/010379
§ 371 (c)(1),
(2) Date: Jun. 26, 2017

(87) PCT Pub. No.: WO2016/111682
PCT Pub. Date: Jul. 14, 2016

(65) Prior Publication Data
US 2019/0214835 A1 Jul. 11, 2019

(51) Int. Cl.
*H02J 7/00* (2006.01)
*H02J 7/02* (2016.01)
(Continued)

(52) U.S. Cl.
CPC .......... *H02J 7/0044* (2013.01); *H02J 7/0027* (2013.01); *H02J 7/025* (2013.01); *H02J 50/10* (2016.02); *H02J 50/80* (2016.02); *H02J 7/00034* (2020.01)

(58) Field of Classification Search
USPC ........................................................ 320/108
See application file for complete search history.

(56) References Cited

U.S. PATENT DOCUMENTS 7,636,590 B2 * 12/2009 Shin .................... H04M 1/0247
455/575.1
8,432,124 B2 * 4/2013 Foster ................... A45C 11/00
320/101

(Continued)

FOREIGN PATENT DOCUMENTS

CN 1525808 9/2004
CN 104037836 9/2014
(Continued)

Primary Examiner — Robert Grant
(74) Attorney, Agent, or Firm — HPI Patent Department

(57) ABSTRACT

An example of a system includes a electronic device having a rechargeable battery, a charging module to charge the rechargeable battery and moveable between a retracted position and an extended position to provide a stand during charging of the rechargeable battery, and a communication module to wirelessly transfer and receive data during charging of the rechargeable battery. The example system also includes a charging mat to charge the rechargeable battery when the charging module is in the extended position and coupled to the charging mat and a docking module to wirelessly transfer data to and wirelessly receive data from the communication module of the electronic device.

14 Claims, 10 Drawing Sheets

(51) Int. Cl.
   *H02J 50/80*   (2016.01)
   *H02J 50/10*   (2016.01)

(56) References Cited

U.S. PATENT DOCUMENTS

| | | | |
|---|---|---|---|
| 2004/0191614 A1* | 9/2004 | Iwasaki | G06F 1/1601 |
| | | | 429/96 |
| 2012/0007549 A1 | 1/2012 | Murayama et al. | |
| 2013/0058023 A1 | 3/2013 | Supran et al. | |
| 2014/0253024 A1* | 9/2014 | Rautiainen | H02J 7/025 |
| | | | 320/108 |

FOREIGN PATENT DOCUMENTS

| | | |
|---|---|---|
| JP | 2012019666 A | 1/2012 |
| WO | WO-2008127510 A1 | 10/2008 |

\* cited by examiner

ELECTRONIC DEVICE WITH CHARGING MODULE

BACKGROUND

End users appreciate performance and features in their electronic devices. They also appreciate ease of use and cost effective solutions for their electronic device needs. Designers and manufacturers may, therefore, endeavor to create and provide electronic devices directed toward at least some of these objectives.

BRIEF DESCRIPTION OF THE DRAWINGS

The following detailed description references the drawings, wherein.

DETAILED DESCRIPTION

Figure 1:
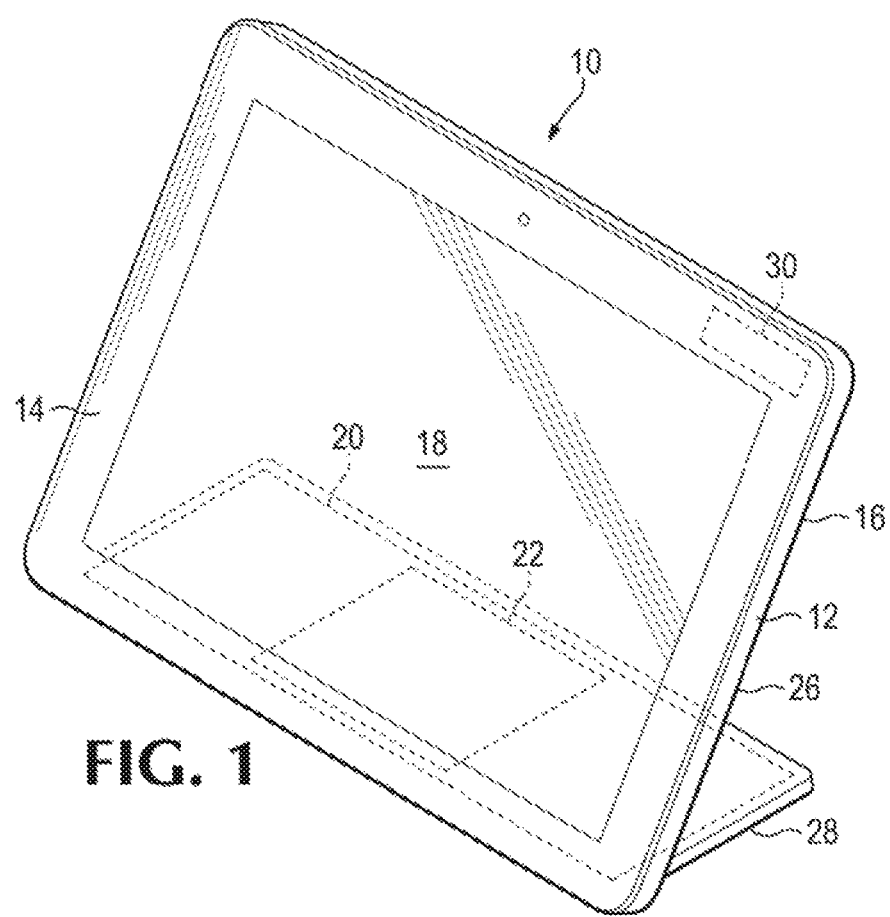
FIG. 1 is a front view of an example of an electronic device.

Electronic devices, such as tablets, allow users to perform many different tasks. The capabilities of electronic devices continues to improve and applications exist and are being developed that allow electronic devices to perform many different tasks.

An electronic device may include a rechargeable battery to provide power during use. One way in which this battery may be recharged when partially or fully depleted is to use a power cable that connects to the electronic device. The use of such a power cable, however, may be perceived as an inconvenience by some end users who may have difficulty locating and keeping track of it. End users may also or alternatively feel tethered to their electronic devices during the recharging of the battery which they may perceive as an inconvenience.

Another way in which the battery of an electronic device may be recharged is through the use of wireless charging. Wireless charging may help to avoid the above-described issues associated with the use of a power cable. However, wireless charging may require that an electronic device lay flat against a charging mat during recharging which some end users may find inconvenient if they want to use the electronic device during recharging.

One way in which this issue associated with wireless charging may be addressed is through the use of a separate charging stand in which the electronic device is placed for recharging. Use of such a stand may allow the electronic device to be viewed at a more convenient angle by an end user during recharging. The use of such a separate charging stand, however, may be perceived as an inconvenience by some end users who may have difficulty locating and keeping track of it. A separate charging stand may also add to the overall cost of ownership of an electronic device which some end users may find undesirable.

It may be desirable to connect an electronic device to an external device or devices. Having this capability expands the versatility of an electronic device by allowing it to connect to a variety of different devices such as, for example, a display, speakers, a printer, a network, etc. This may be difficult to accomplish with existing electronic device designs which may be limited in the type and/or number of such connections they can establish.

Examples of an electronic device, system and method to use with an electronic device are shown in FIGS. 1-13. These examples are directed to addressing the above-described technical challenges associated with the use of a rechargeable battery in an electronic device and also of allowing an electronic device to connect to an external device or devices.

As used herein, the term "coupled" represents, but is not necessarily limited to, any suitable direct and/or indirect connection. For example, if a first component is described as being coupled to a second component, that coupling may be: (1) through a direct electrical, magnetic and/or mechanical connection, (2) through an indirect electrical, magnetic and/or mechanical connection via other devices and connections, (3) through an optical electrical connection, (4) through a wireless electrical connection and/or (5) another suitable connection. As used herein, the terms "include", "includes", "including", "have", "has", "having" and variations thereof, mean the same as the terms "comprise", "comprises", and "comprising" or appropriate variations thereof.

A front view of an example of an electronic device 10 (in this case a tablet) is shown in FIG. 1. As can be seen in FIG. 1, electronic device 10 includes a housing 12 having a first side 14 and a second side 16. In this example of electronic device 10, first side 14 is opposite second side 16. Also in this example, first side 14 is the front of electronic device 10 and second side 16 is the back of electronic device 10). Electronic device 10 includes a display 18 on first side 14 of housing 12 and a rechargeable battery 20 to power electronic device 10. As can also be seen in FIG. 1, electronic device 10 includes a charging module 22 beneath rechargeable battery 20 and coupled both to rechargeable battery 20 and to housing 12. Charging module 22 may utilize any of a variety of different technologies to charge rechargeable battery 20 including, without limitation, magnetic resonance (e.g., the Alliance for Wireless Power (A4WP)), inductive coupling, or capacitive coupling.

Figure 2:
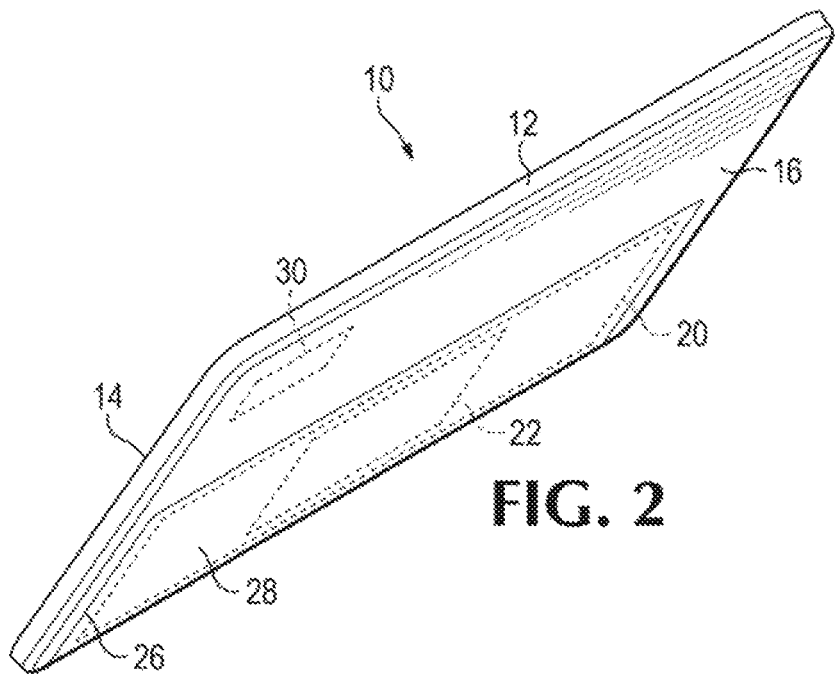
FIG. 2 is a back view of the example electronic device of FIG. 1.

Charging module 22 is moveable between an extended position, shown in FIG. 1, out of a recess 26 in a portion of second side 16 of housing 12 to provide a stand 28 to housing 12 and to allow display 18 to be utilized during charging of rechargeable battery 20, and a retracted position, shown in FIG. 2, inserted into recess 26 so as to be substantially flush with second side 16 of housing 12. As can additionally be seen in FIG. 1, in this example of electronic device 10, rechargeable battery 20 occupies a large portion of stand 28 which helps to provide weight and stability to stand 28 when charging module 22 is in the extended position.

Having charging module 22 and stand 28 substantially flush with second side 16 of housing 12 in the retracted position helps to prevent charging module 22 and stand 28 from being inadvertently moved to the extended position which may occur if charging module 22 and stand 28 where on the outside of housing 12 where they could catch on an item or object. Having charging module 22 and stand 28 substantially flush with second side 16 of housing 12 also allows electronic device 12 to have a thinner width than would otherwise be possible if charging module 22 and stand 28 were on the outside of housing 12. This thinner width may be perceived as a benefit to some end users because it allows electronic device 12 to be more easily handled, stored and/or transported.

As can further be seen, for example, in FIG. 1, electronic device 10 includes a communication module 30 in housing 12 to wirelessly transfer and receive data during charging of rechargeable battery 20 by charging module 22. Communication module 30 may utilize any of a variety of different wireless communication technologies including without limitation, the Wireless Gigabit Alliance (WiGig) communications technology. Communication module 30 may also wirelessly transfer and receive data when rechargeable battery 20 is not being charged by charging module 22.

Figure 3:
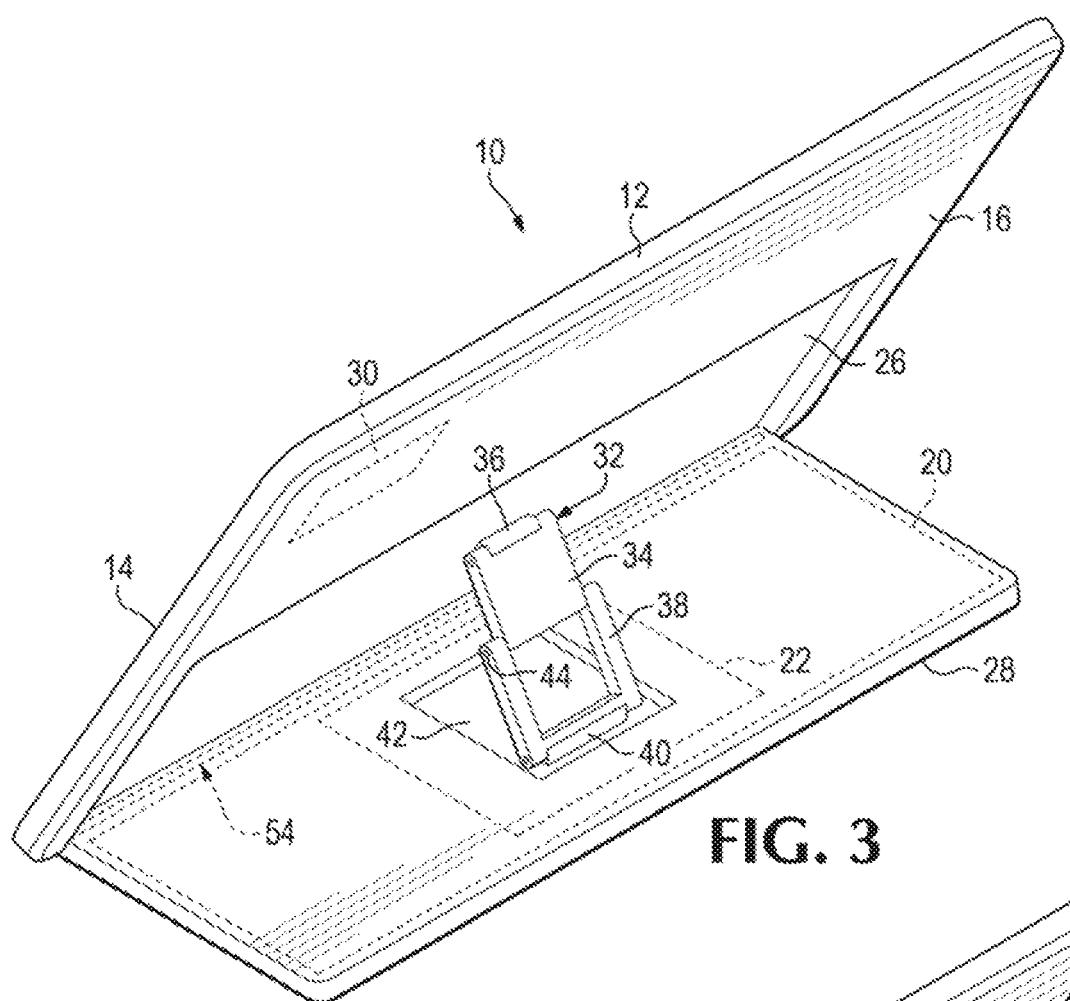
FIG. 3 is an example of a kickstand in an unfolded condition to support the housing of the electronic device of FIG. 1.

An example of a kickstand 32 in an unfolded condition to support housing 12 of electronic device 10 when charging module 22 is in the extended position out of recess 26 is shown in FIG. 3. As can be seen in FIG. 3, in this example, kickstand 32 includes a first member 34 pivotally coupled to a bracket 36 in recess 26. Kickstand 32 also includes a second member 38 pivotally coupled to a bracket 40 in a recess 42 defined in charging module 22 and stand 28. As can also be seen in FIG. 3, first member 34 of kickstand 32 is pivotally connected to second member 38 of kickstand 32 by a hinge 44.

Figure 4:
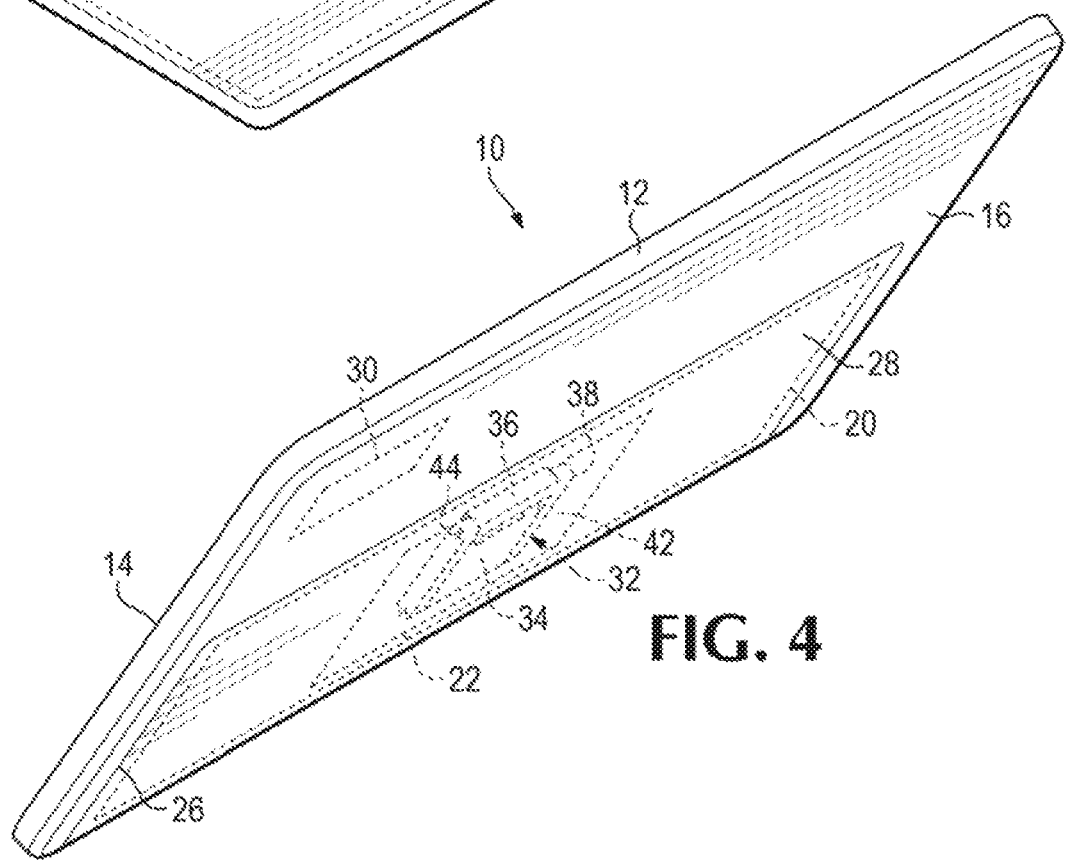
FIG. 4 is an example of the kickstand of FIG. 3 in a folded condition.

An example of kickstand 32 in a folded condition inside recess 42 is shown in FIG. 4. As can be seen by comparing FIGS. 3 and 4, kickstand 32 is moveable between the unfolded condition out of recess 42 shown in FIG. 3 when charging module is in the extended position out of recess 26 and the folded condition inside recess 42 shown in FIG. 4 when charging module is in the retracted position inside recess 26. Although a single kickstand 32 is shown in FIGS. 3 and 4, it is to be understood that other examples of electronic device 10 may include multiple kickstands to support housing 12 of electronic device 10 when charging module 22 is in the extended position out of recess 26. Additionally or alternatively, other examples of electronic device 10 may utilize a kickstand that is designed differently than kickstand 32.

Figure 5:
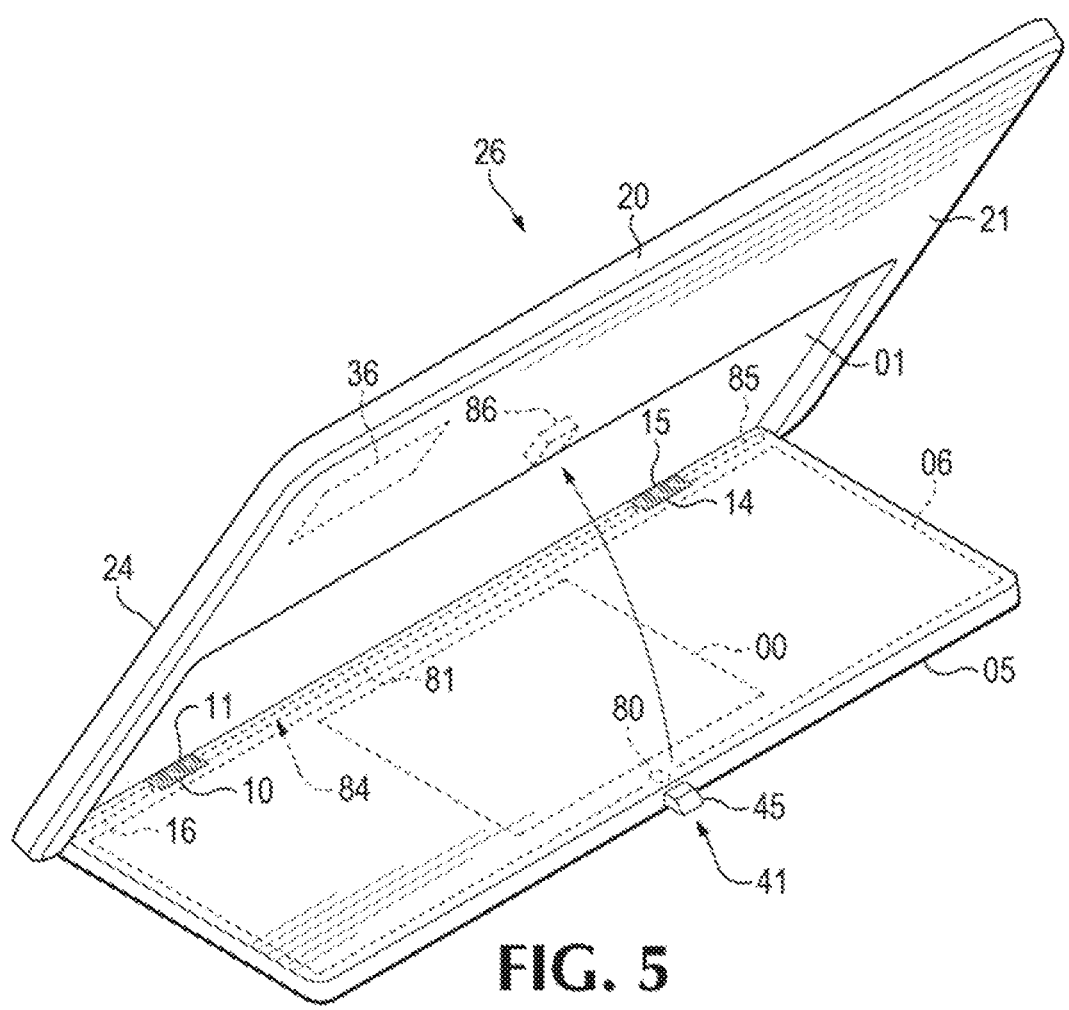
FIG. 5 is an example of a latch assembly and a hinge assembly for the electronic device of FIG. 1.

An example of a latch assembly 46 to releaseably retain charging module 22, as well as stand 28, in recess 26 in the retracted position is shown in FIG. 5. As can be seen in FIG. 5, latch assembly 46 includes a latch 48 that is received in a recess 50 in second side 16 of housing 12 to secure charging module 22 and stand 28 in recess 26. Latch assembly 46 helps prevent charging module 22 and stand 28 from being inadvertently deployed into the extended position. As can also be seen in FIG. 5, latch assembly 46 also includes a manually actuated button 52 that may be utilized to remove latch 48 from recess 50 so that charging module 22 and stand 28 may be moved to the extended position to support housing 12 of electronic device 10, as shown.

As can additionally be seen in FIG. 5, electronic device 10 may also include a hinge assembly 54 to couple charging module 22, as well as stand 28, to housing 12. Hinge assembly 54 also allows charging module 22, as well as stand 28, to be moved from the retracted position shown, for example, in FIG. 2, to the extended position shown, for example, in FIGS. 1 and 5. As can be seen in FIG. 5, in this example, hinge assembly 54 includes a rod 56 in stand 28 that includes a first end 58 disposed in a first opening (not shown) in housing 12 and a second end 60 disposed in a second opening (also not shown) in housing 12. As can also be seen in FIG. 5, in this example, hinge assembly 54 also includes a torsion member 62 and a torsion member 64 that help to retain charging module 22, as well as stand 28, in the extended position. In this example, torsion members 62 and 64 include respective torsion springs 66 and 68.

Figure 6:
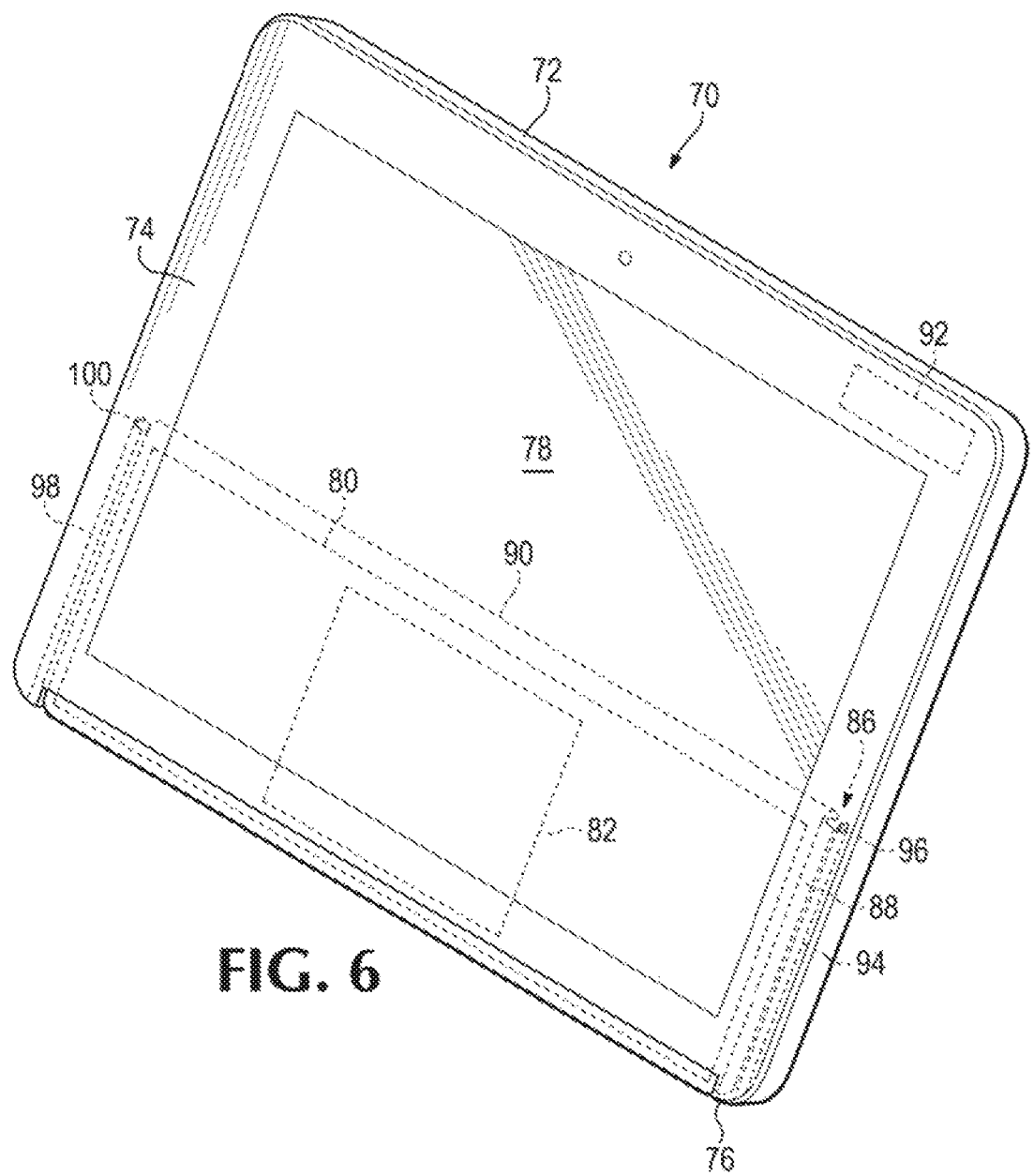
FIG. 6 is a front view of another example of an electronic device.
Figure 7:
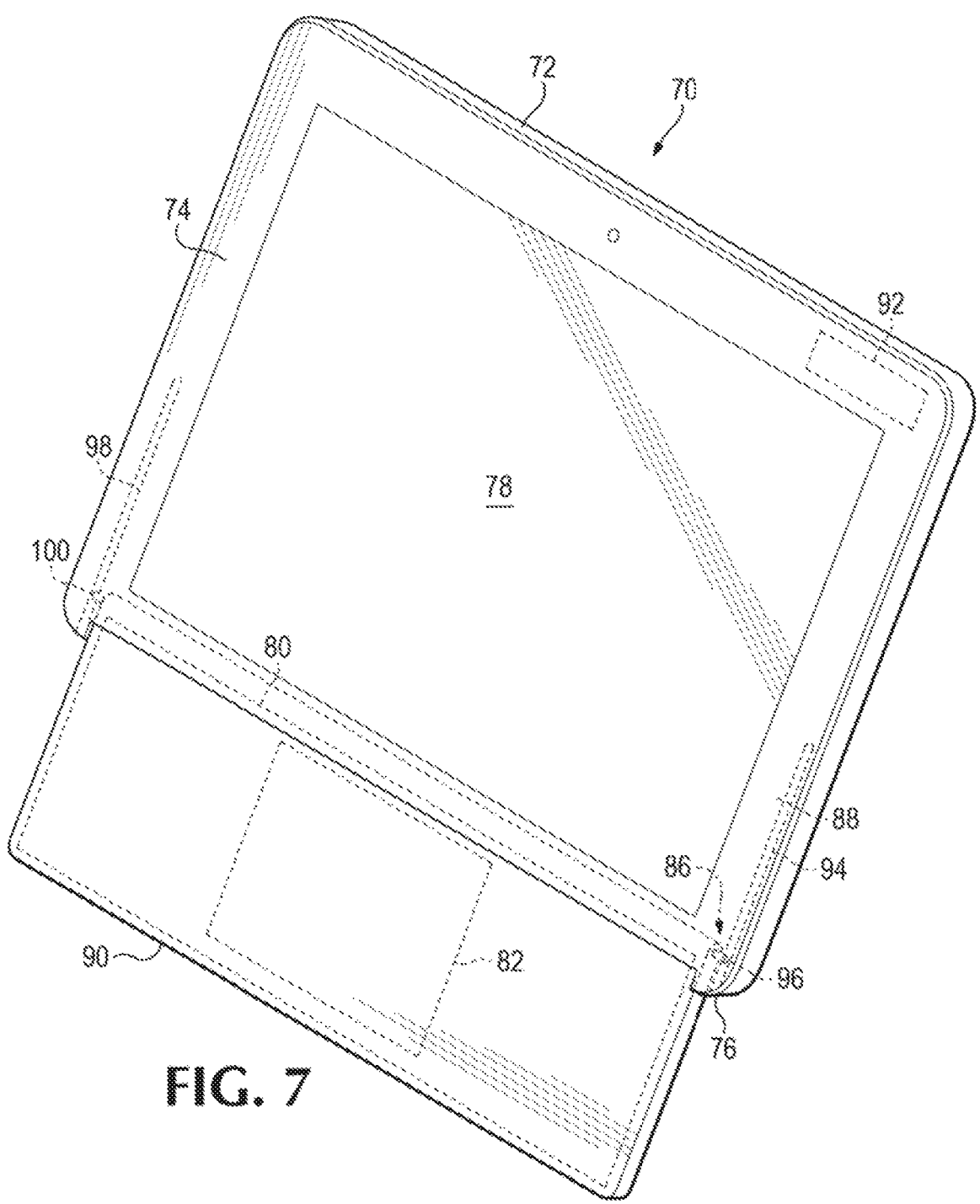
FIG. 7 is another front view of the electronic device of FIG. 6.

A front view of another example of an electronic device 70 (in this case a tablet) is shown in FIG. 6. As can be seen in FIG. 6, electronic device 70 includes a housing 72 having a first side 74 and a second side 76 (in this case the bottom of housing 72). Electronic device 70 includes a display 78 on first side 74 of housing 72 and a rechargeable battery 80 to power electronic device 70. As can also be seen in FIG. 6, electronic device 70 includes a charging module 82 beneath rechargeable battery 80 and coupled both to rechargeable battery 80 and to housing 72 by hinge assembly 86. Charging module 82 may utilize any of a variety of different technologies to charge rechargeable battery 80 including, without limitation, magnetic resonance (e.g., the Alliance for Wireless Power (A4WP)), inductive coupling, or capacitive coupling.

Figure 8:
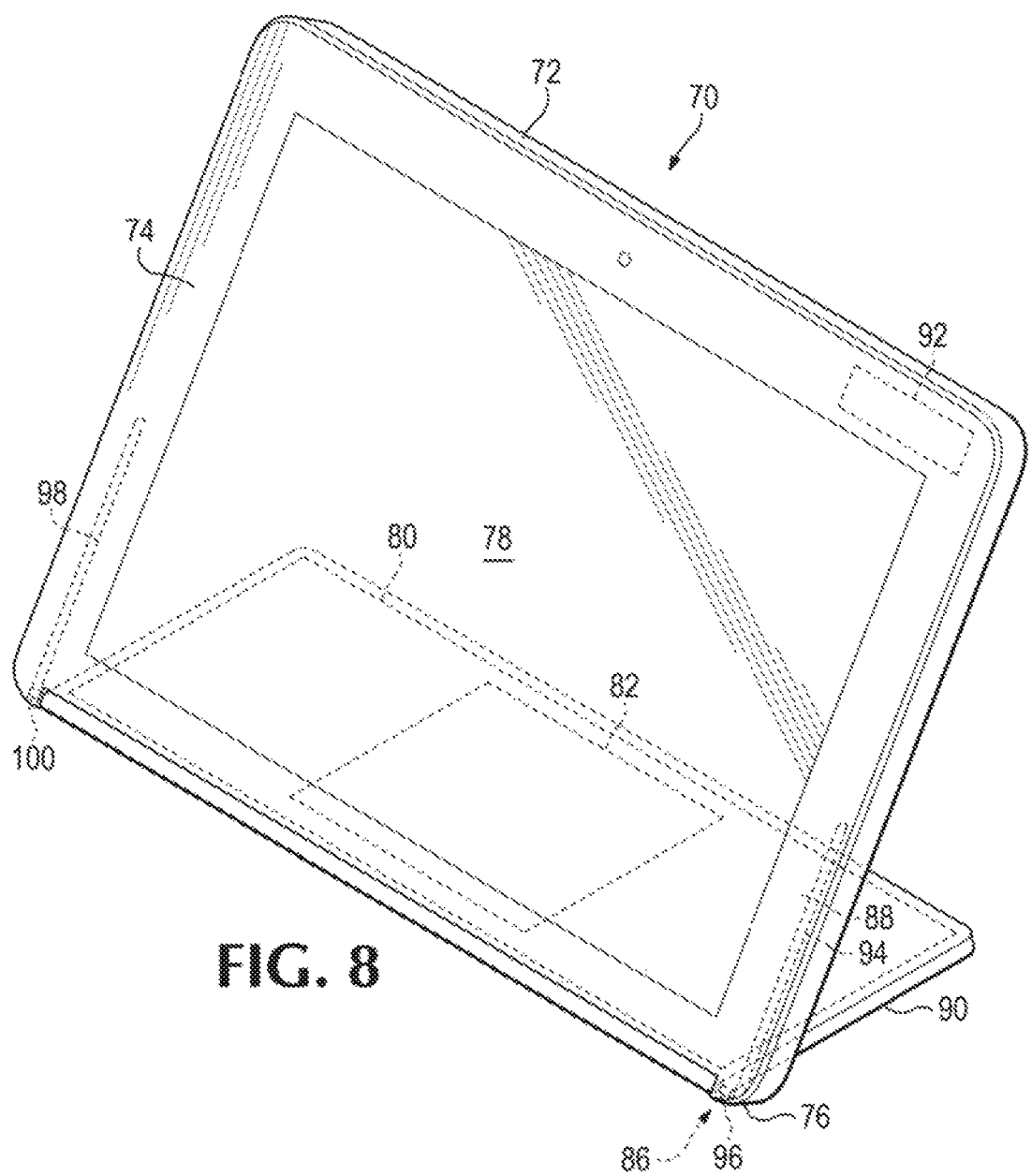
FIG. 8 is an additional front view of the electronic device of FIG. 6.

Charging module 82 is moveable between the retracted position, shown in FIG. 6, inserted into a recess 88 in a portion of second side 76 of housing 72 so as to be substantially flush with second side 76 of housing 72 and an extended position, shown in FIG. 8, to provide a stand 90 to housing 72 and to allow display 78 to be utilized during charging of rechargeable battery 80. As can additionally be seen in FIG. 6, in this example of electronic device 70, rechargeable battery 80 occupies a large portion of stand 90 which helps to provide weight and stability to stand 90 when charging module 82 is in the extended position.

Having charging module 82 and stand 90 substantially flush with second side 76 of housing 72 in the retracted position helps to prevent charging module 82 and stand 90 from being inadvertently moved to the extended position which may occur if charging module 82 and stand 90 were on the outside of housing 72 where they could catch on an item or object. Having charging module 82 and stand 90 substantially flush with second side 76 of housing 72 also allows electronic device 70 to have a thinner width than would otherwise be possible if charging module 82 and stand 90 were on the outside of housing 72. This thinner width may be perceived as a benefit to some end users because it allows electronic device 70 to be more easily handled, stored and or transported.

As can additionally be seen, for example, in FIG. 6, electronic device 70 includes a communication module 92 in housing 72 to wirelessly transfer and receive data during charging of rechargeable battery 80 by charging module 82. Communication module 92 may utilize any of a variety of different wireless communication technologies including, without limitation, the Wireless Gigabit Alliance (WiGig) communications technology. Communication module 92 may also wirelessly transfer and receive data when rechargeable battery 80 is not being charged by charging module 82.

As discussed above, electronic device 70 includes a hinge assembly 86. As can further be seen in FIG. 6, hinge assembly 86 includes a first track 94 in which a first pin 96 is slideably disposed and a second track 98 in which a second pin 100 is slideably disposed. Respective first and second tracks 94 and 98 and respective first and second pins 96 and 100 of hinge assembly 86 couple charging module 82 and stand 90 to housing 72 and also allow charging module 82 and stand 90 to be moved from the retracted position shown in FIG. 6 to the partially extended position shown in FIG. 7 by translating first pin 96 in first track 94 and second pin 100 in second track 98 from the position shown in FIG. 6 to the position shown in FIG. 7. Respective first and second pins 96 and 100 are then rotated in respective first and second tracks 94 and 98 to move charging module 82 and stand 90 from the partially extended position shown in FIG. 7 to the extended position shown in FIG. 8.

Figure 9:
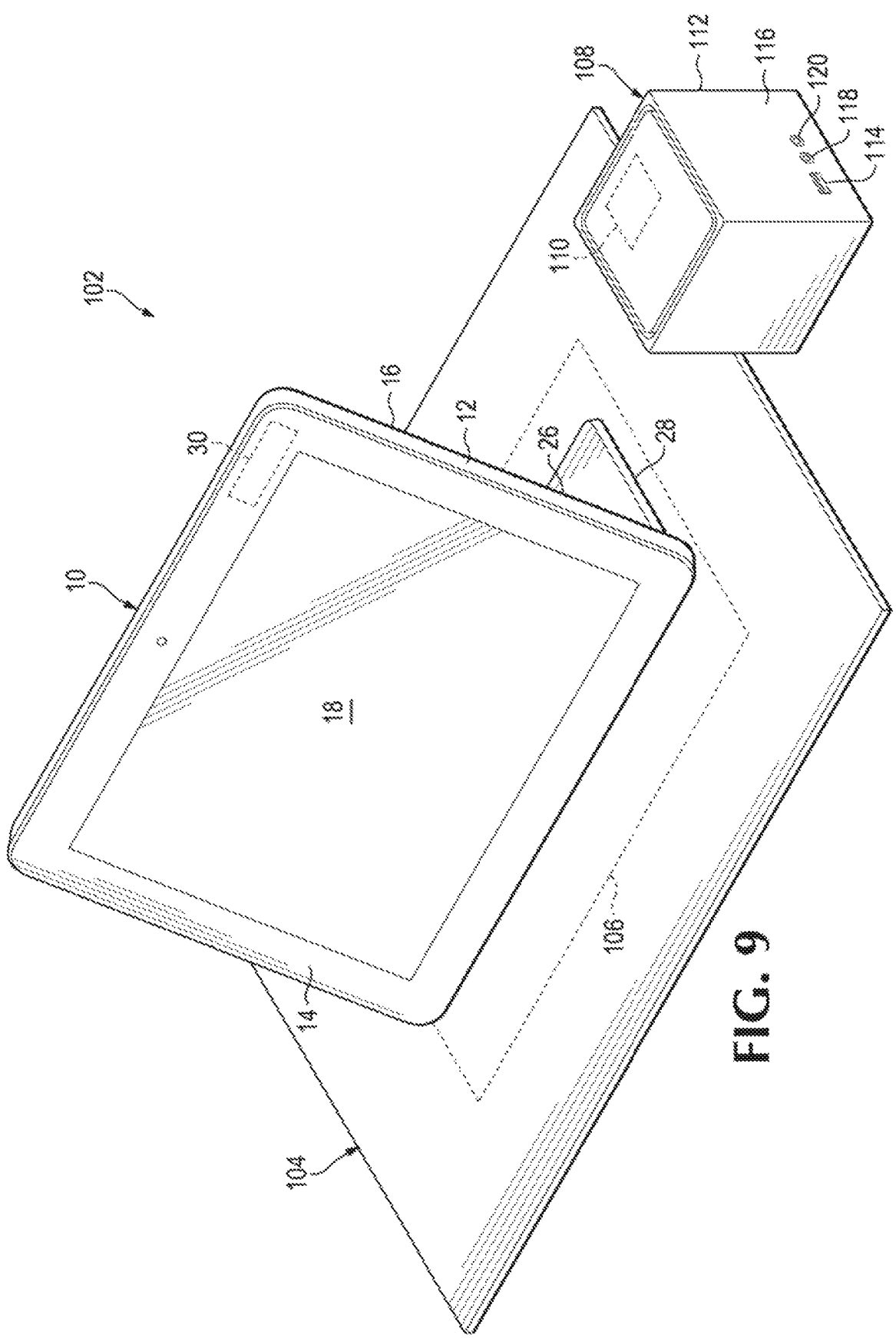
FIG. 9 is a front view of an example of a system.

A front view of an example of a system 102 is shown in FIG. 9. As can be seen in FIG. 9, system 102 includes electronic device 10, but, it is to be understood, that system 102 will also work with electronic device 70. As can also be seen in FIG. 9, system 102 includes a charging mat 104 to charge rechargeable battery 20 when charging module 22 is in the extended position and coupled to charging mat 104 via charging area 106. Charging mat 104 may utilize any of a variety of different technologies to charge rechargeable battery 20 including, without limitation, magnetic resonance (e.g., the Alliance for Wireless Power (A4WP)), inductive coupling, or capacitive coupling.

As can additionally be seen in FIG. 9, system 102 also includes a docking module 108 that includes a communication module 110 to wireless transfer data to and wireless receive data from communication module 30 of electronic device 10. Communication module 110 may utilize any of a variety of different wireless communication technologies including, without limitation, the Wireless Gigabit Alliance (WiGig) communications technology. Docking module 108 includes a housing 112 positionable in a variety of different locations (including the one shown) adjacent electronic device 10 to wirelessly transfer data to and wirelessly receive data front communication module 30 of electronic device 10 via communication module 110.

Figure 10:
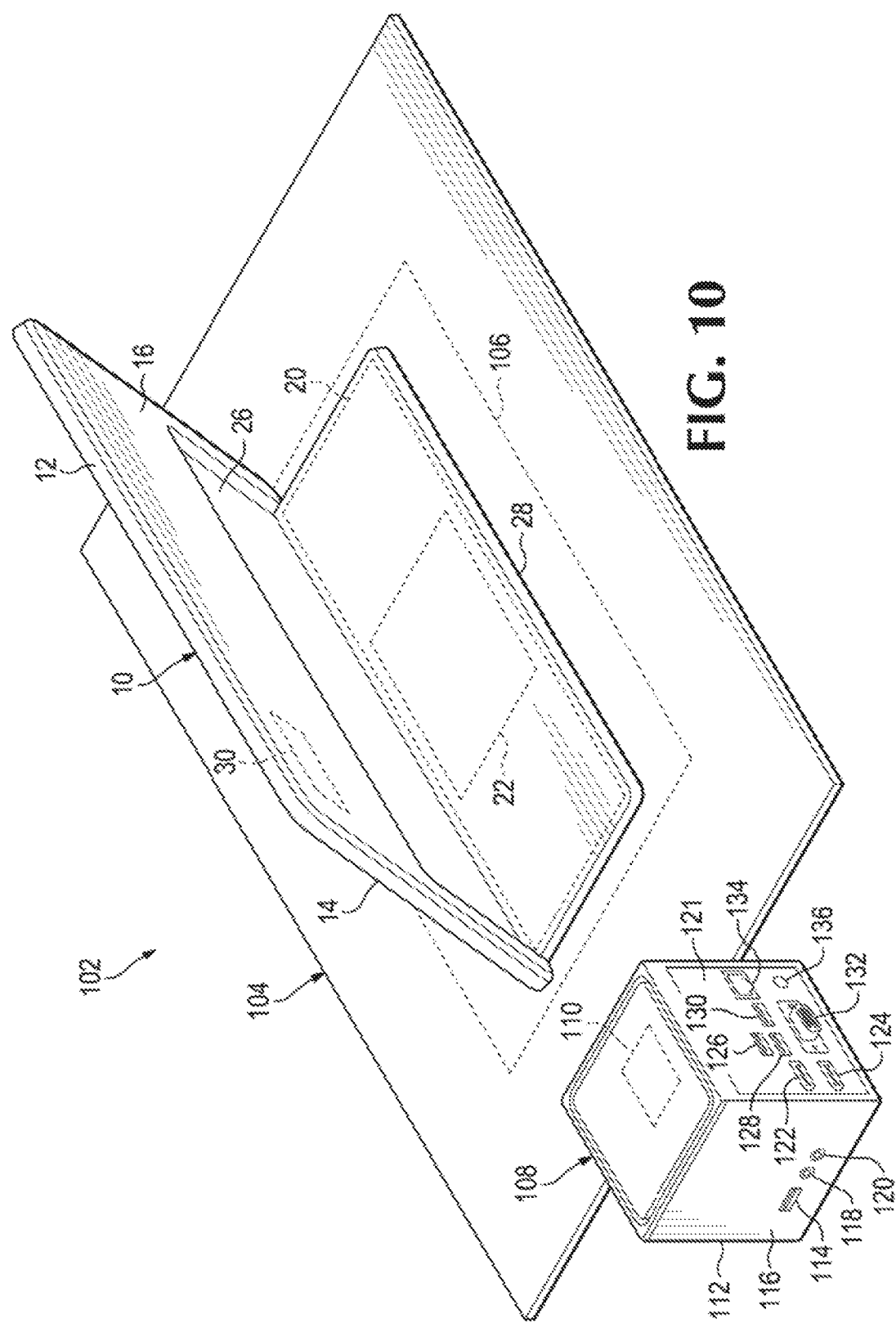
FIG. 10 is a back view of the system of FIG. 9.

A back view of system 102 is shown in FIG. 10. As can be seen in FIG. 10, docking module 108 includes a variety of electrical connectors to allow electronic device 10 to connect to different devices which helps expand the versatility of electronic device 10. In this example, docking module 108 includes a Universal Serial Bus (USB) connector 114 on side 116 of housing 112 and audio connectors 118 and 120 on side 116 of housing 112. As can also be seen in FIG. 10, back side 121 of housing 112 of docking module 103 includes display port connectors 122 and 124, USB connectors 126, 128, and 130, Video Graphics Array (VGA) connector 132, Ethernet connector 134, and power connector 136 to supply power to docking module 108. It is to be understood, however, that other examples of docking module 108 may include a fewer number or a greater number of electrical connectors. Alternatively or additionally, it is also to be understood that other examples of docking module 108 may include a different electrical connector or electrical connectors.

Figure 11:
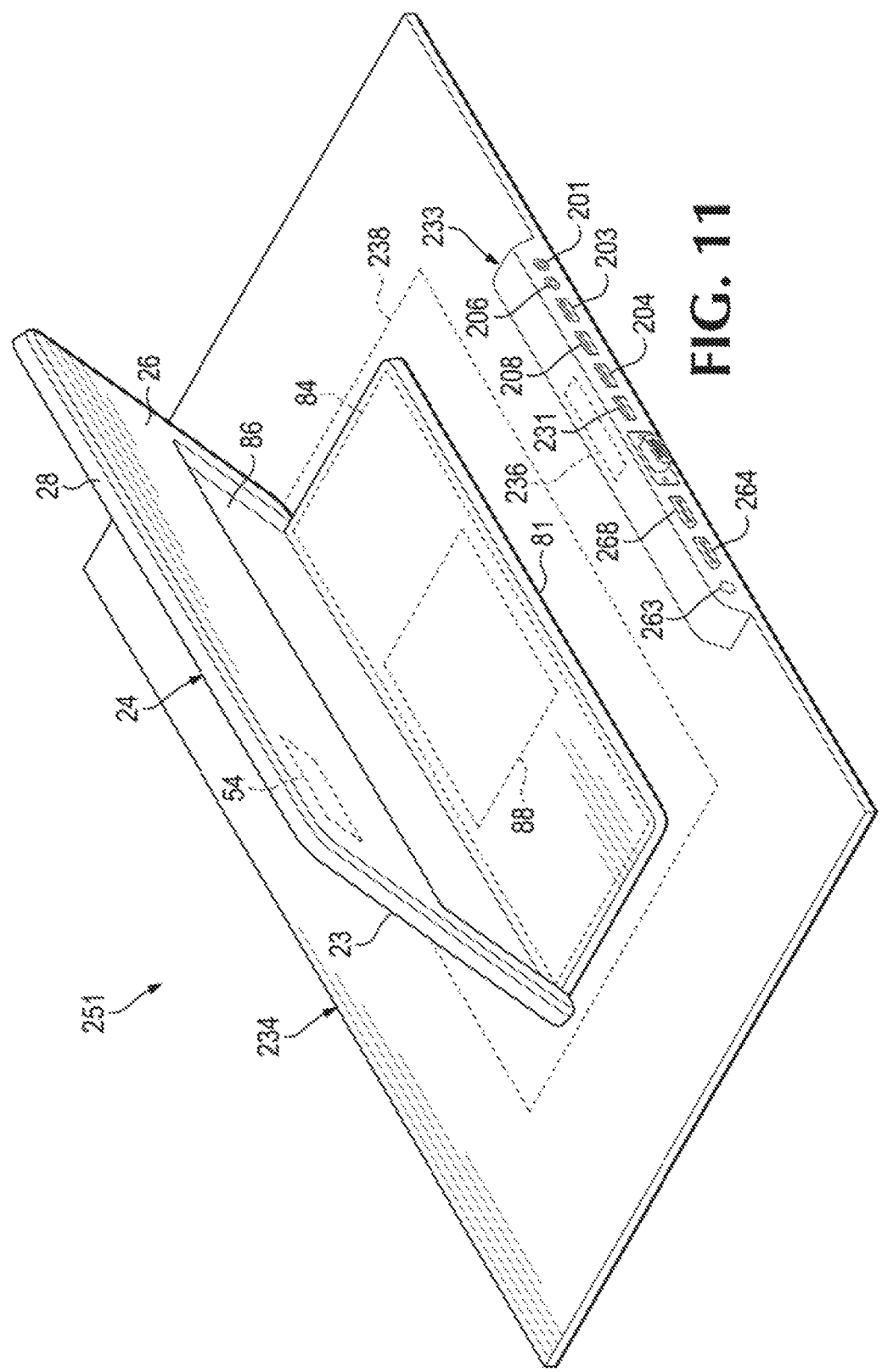
FIG. 11 is a back view of another example of a system.

A back view of another example of a system 138 is shown in FIG. 11. As can be seen in FIG. 11, system 138 includes electronic device 10, but, it is to be understood, that system 138 will also work with electronic device 70. As can also be seen in FIG. 11, system 138 includes a charging mat 140 to charge rechargeable battery 20 when charging module 22 is in the extended position and coupled to charging mat 140 via charging area 142. Charging mat 140 may utilize any of a variety of different technologies to charge rechargeable battery 20 including, without limitation, magnetic resonance (e.g., the Alliance for Wireless Power (A4WP)), inductive coupling, or capacitive coupling.

As can additionally be seen in FIG. 11, system 138 also includes a dock mg module 144 that is integral with charging mat 140. Docking module 144 includes a communication module 146 to wireless transfer data to and wirelessly receive data from communication module 30 of electronic device 10. Communication module 146 may utilize any of a variety of different wireless communication technologies including, without limitation, the Wireless Gigabit Alliance (WiGig) communications technology.

As can further be seen in FIG. 11, docking module 144 includes a variety of electrical connectors to allow electronic device 10 to connect to different devices which helps expand the versatility of electronic device 10. In this example, docking module 144 includes Universal Serial Bus (USB) connectors 148, 150, 152, and 154, audio connectors 156 and 158, display port connectors 160 and 162, and power connector 164 to supply power to docking module 144. It is to be understood, however, that other examples of docking module 144 may include a fewer number or a greater number of electrical connectors. Alternatively or additionally, it is also to be understood that other examples of docking module 144 may include a different electrical connector or electrical connectors.

Figure 12:
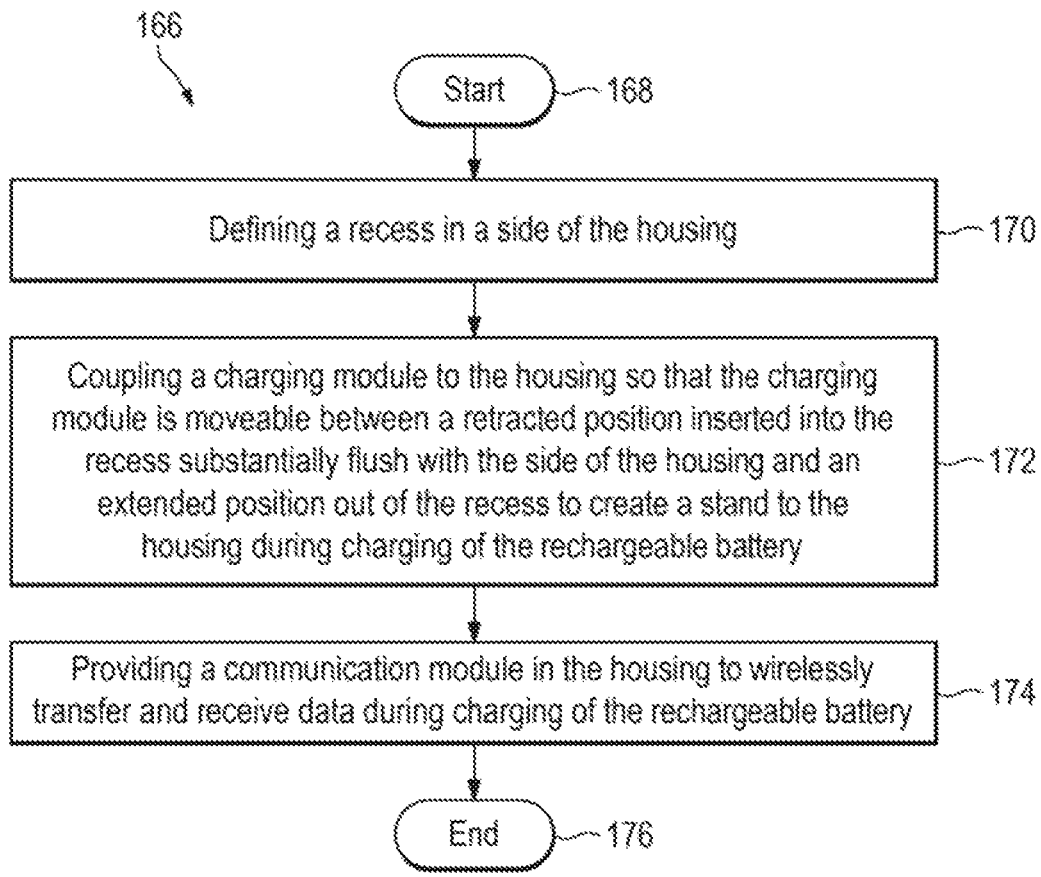
FIG. 12 is an example of a method to use with an electronic device.

An example of a method 166 to use with an electronic device that includes a housing and a rechargeable battery is shown in FIG. 12. As can be seen in FIG. 12, method 166 starts 168 by defining a recess in a side of the housing, as indicated by block 170 and coupling a charging module to the housing so that the charging module is moveable between a retracted position inserted into the recess substantially flush with the side of the housing and an extended position out of the recess to create a stand to the housing during charging of the rechargeable battery, as indicated by block 172. As can also be seen in FIG. 12, method 166 also includes providing a communication module in the housing to wirelessly transfer and receive data during charging of the rechargeable battery, as indicated by block 174. Method 166 may then end 176.

Figure 13:
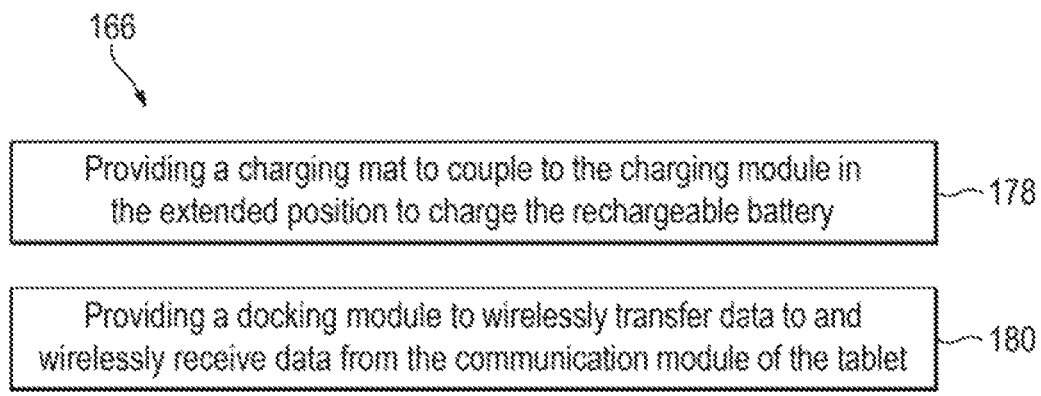
FIG. 13 is an example of additional elements of the method to use with an electronic device of FIG. 12.

An example of additional elements of method 166 is shown in FIG. 13. As can be seen in FIG. 13, method 166 may include providing a charging mat to couple to the charging module in the extended position to charge the rechargeable battery, as indicated by block 178. Alternatively or additionally, method 166 may include providing a docking module to wirelessly transfer data to and wirelessly receive data from the communication module of the electronic device, as indicated by block 180.

Although several drawings have been described and illustrated in detail, it is to be understood that the same are intended by way of illustration and example. These examples are not intended to be exhaustive or to be limited to the precise form disclosed. Modifications and variations may well be apparent. For example, although not shown, it is to be understood that in other examples of electronic device 10 and/or electronic device 70, respective charging module 22 and/or 82, as well as respective stand 28 and/or 90 may be moveable to more than one extended position. Additionally or alternatively, respective charging module 22 and/or 82, as well as respective stand 28 and/or stand 90 may be moveable in a direction opposite that shown and described above. As another example, although not shown, it is to be understood that electronic device 70 may also include a latch assembly to releaseably retain charging module 82 and stand 90 in recess 88 in the retracted position. As an additional example, although not shown, it is to be understood that electronic device 70 may alternatively or additionally include a kickstand or kickstands coupled to housing 72 and charging module 82 to help support housing 72 when charging module 82 is in the extended position. This kickstand or these kickstands may also be moveable between an unfolded condition when charging module 82 is in the extended position and a folded condition when charging module 82 is in the retracted position.

Additionally, reference to an element in the singular is not intended to mean one, unless explicitly so stated. Furthermore, method elements are not limited to the sequence or order described and illustrated. Moreover, no element or component is intended to be dedicated to the public regardless of whether the element or component is explicitly recited in the following claims.

What is claimed is:

1. An electronic device, comprising:
   a housing including a first side and a second side, the housing defining a recess in a portion of the second side;
   a display on the first side of the housing, wherein the display is in a fixed relationship with the recess and the recess is integrated into the housing with the display;
   a rechargeable battery;
   a charging module coupled both to the rechargeable battery and to the housing, and moveable between a retracted position inserted into the recess so as to be substantially flush with the second side of the housing and an extended position out of the recess both to provide a stand to the housing and to allow the display to be used during charging of the rechargeable battery;
   a kickstand coupled between the housing and the charging module in the retracted position and the extended position, the kickstand comprising a first member pivotally coupled to a first bracket in the recess and a second member pivotally coupled to a second bracket in a second recess of the charging module, wherein the first member is pivotally coupled to the second member; and
   a communication module in the housing to wirelessly transfer and receive data during charging of the rechargeable battery.

2. The electronic device of claim 1, wherein the first side of the housing is opposite the second side of the housing.

3. The electronic device of claim 1, wherein the kickstand is to support the housing when the charging module is in the extended position.

4. The electronic device of claim 3, wherein the kickstand is moveable between an unfolded condition when the charging module is in the extended position and a folded condition when the charging module is in the retracted position.

5. The electronic device of claim 1, further comprising a hinge assembly to couple the charging module to the housing and to allow the charging module to be moved between the retracted position and the extended position.

6. The electronic device of claim 5, wherein the hinge assembly includes a torsion member to help retain the charging module in the extended position.

7. The electronic device of claim 1, further comprising a latch assembly to releaseably retain the charging module in the recess in the retracted position.

8. A system, comprising:
   an electronic device including a rechargeable battery, a charging module to charge the rechargeable battery and moveable between a retracted position and an extended position to provide a stand during charging of the rechargeable battery, a communication module to wirelessly transfer and receive data during charging of the rechargeable battery, wherein the electronic device includes a housing that defines a recess in a side of the housing, wherein a display in the housing is in a fixed relationship with the recess, and further wherein the charging module is inserted into the recess in the retracted position so as to be substantially flush with the side of the housing, and a kickstand coupled between the housing and the charging module in the retracted position and the extended position, the kickstand comprising a first member pivotally coupled to a first bracket in the recess and a second member pivotally coupled to a second bracket in a second recess of the charging module, wherein the first member is pivotally coupled to the second member;
   a charging mat to charge the rechargeable battery when the charging module is in the extended position and coupled to the charging mat; and
   a docking module to wirelessly transfer data to and wirelessly receive data from the communication module of the electronic device.

9. The system of claim 8, wherein the docking module includes at least one electrical connector to wirelessly couple to the electronic device via the docking module and the communication module.

10. The system of claim 9, wherein the docking module is integral with the charging mat.

11. The system of claim 9, wherein the docking module includes a second housing positionable in one of a plurality of different locations adjacent the electronic device to wirelessly transfer data to and wirelessly receive data from the communication module of the electronic device.

12. A method to use with an electronic device that includes a housing and a rechargeable battery, comprising:
    defining a recess in a side of the housing;
    coupling a charging module to the housing so that the charging module is moveable between a retracted position inserted into the recess substantially flush with the side of the housing and an extended position out of the recess to create a stand to the housing during charging of the rechargeable battery, wherein a display in the housing is in a fixed relationship with the recess and the recess is integrated into the housing with the display;
    coupling a kickstand between the housing and the charging module by pivotally coupling a first member of the kickstand to a second member of the kickstand, pivotally coupling the first member to a first bracket in the recess, and pivotally coupling the second member to a second bracket in a second recess of the charging module, wherein the kickstand is attached to the housing and the charging module in the retracted position and the extended position; and
    providing a communication module in the housing to wirelessly transfer and receive data during charging of the rechargeable battery.

13. The method of claim 12, further comprising providing a charging mat to couple to the charging module in the extended position to charge the rechargeable battery.

14. The method of claim 12, further comprising providing a docking module to wirelessly transfer data to and wirelessly receive data from the communication module of the electronic device.

* * * * *